Figure 1:
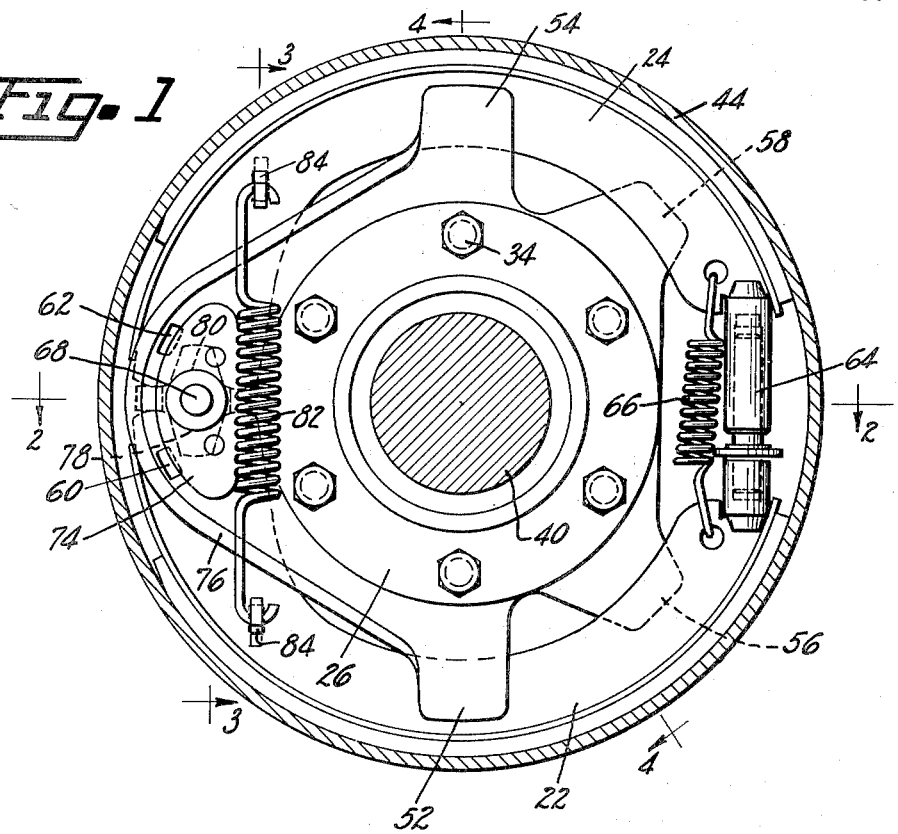

Nov. 13, 1956  E. K. DOMBECK  2,770,325
BRAKE AND ACTUATING MECHANISM THEREFOR
Filed Aug. 9, 1947  3 Sheets-Sheet 1

INVENTOR.
EDWARD K. DOMBECK
BY
*T. J. Plante*
ATTORNEY

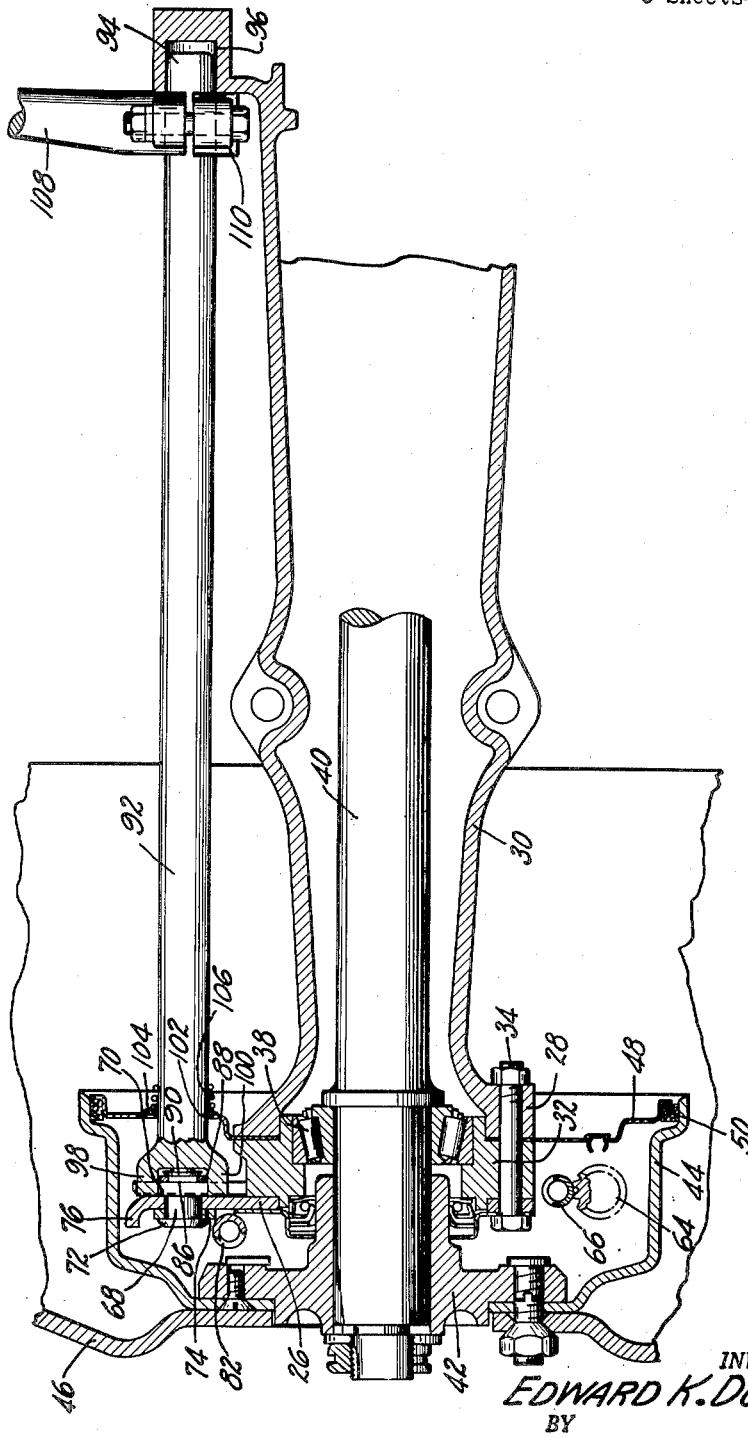

Nov. 13, 1956     E. K. DOMBECK     2,770,325
BRAKE AND ACTUATING MECHANISM THEREFOR
Filed Aug. 9, 1947     3 Sheets-Sheet 3
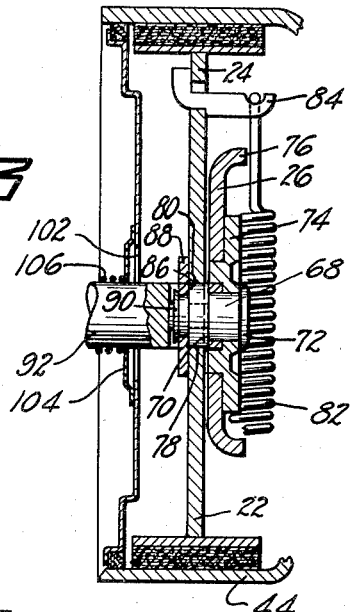
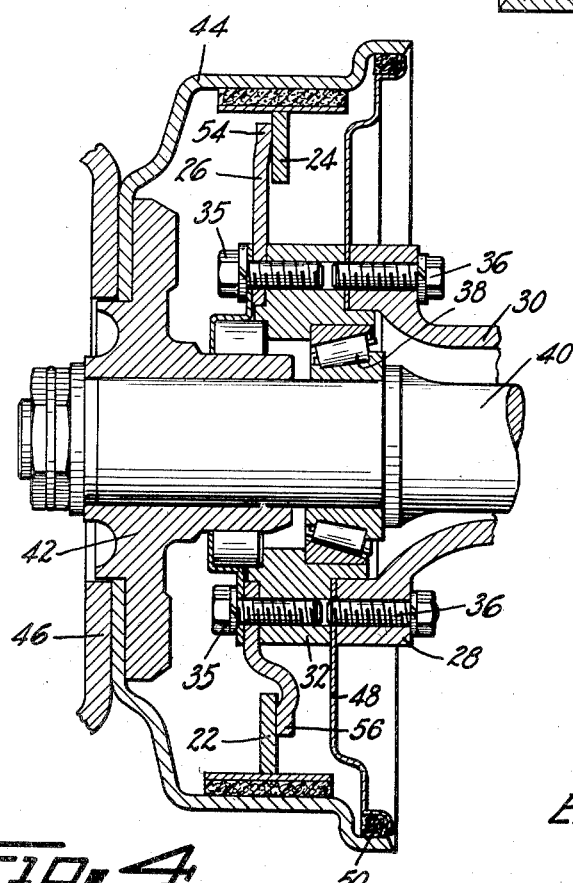
INVENTOR.
EDWARD K. DOMBECK
BY
T. J. Plante
ATTORNEY

United States Patent Office 2,770,325
Patented Nov. 13, 1956

2,770,325

BRAKE AND ACTUATING MECHANISM THEREFOR

Edward K. Dombeck, South Bend, Ind., assignor to Bendix Aviation Corporation, South Bend, Ind., a corporation of Delaware Application August 9, 1947, Serial No. 767,710

10 Claims. (Cl. 188—18)

This invention relates to a brake and actuating mechanism therefor, in which certain new principles are applied to the construction and mounting of the brake actuating shaft. The arrangement shown is particularly adapted for farm tractors, but is of course available for braking purposes in any desired usage.

The primary object of the present invention is to simplify the actuating mechanism of a mechanically operated brake, while at the same time improving its operating characteristics.

The chief factor in obtaining the desired simplification is the use of a "floating" actuating shaft, which is not guided in the customary anchor sleeve at the end adjacent the brake, and which acts directly on the brake shoes without the intermediary of a floating lever.

Other objects and advantages of the present invention will become apparent during the following discussion, reference being had therein to the accompanying drawings, in which:

Figure 1 is a side elevation of a brake assembly, which incorporates certain novel features;

Figure 2 is a section taken on the line 2—2 of Figure 1, showing the cross-section of the brake, and also showing the arrangement of the brake actuating shafts; and Figures 3 and 4 are sections taken on the lines 3—3 and 4—4, respectively, of Figure 1.

The brake shown in Figures 1 to 4, inclusive, comprises brake shoes 22 and 24, mounted on a supporting plate, or spider, 26. The spider is carried by a flange 28 on the axle housing 30, a bearing retainer 32 being secured between the spider and the axle housing flange by the bolts 34. As shown in Figure 4, oppositely extending studs 35 and 36 may be used to separately secure the spider to the bearing retainer and subsequently secure the bearing retainer to the flange 28, the through-bolts 34 being placed in position after the spider and bearing retainer have been mounted by means of the studs.

The bearing assembly 38 is mounted between the rotatable axle 40 and the nonrotatable axle housing 30. Splined to the outer end of axle 40 is the hub 42, to which the brake drum 44 and the wheel 46 are secured. In order to protect the working parts of the brake assembly from dust and other foreign matter, a cover plate 48 is placed over the open side of the drum 44, a felt seal 50 being mounted between the cover plate and the drum at the outer edge of the cover. The inner edge of cover plate 48 is secured between bearing retainer 32 and axle housing flange 28 means of bolts 34 and studs 36.

It will be noted that brake shoes 22 and 24 are mounted on the side of spider 26 which faces toward the center of the vehicle. With this arrangement, the actuating mechanism for the brake shoes does not have to pass through the spider. The shoes 22 and 24, which are T-shaped in cross-section, are guided between the outwardly extending arms 52 and 54 formed on spider 26, which lie in front of the shoe webs, as viewed in Figure 1, and the outwardly extending arms 56 and 58 formed on spider 26, which lie behind the shoe webs, as viewed in the same figure. The left ends of the shoes rest against ledges 60 and 62 formed on the spider, thus obtaining additional lateral support and guidance.

The brake arrangement shown is one in which the secondary shoe anchors during brake application, while the primary shoe moves with the drum and exerts applying force on the secondary shoe, the entire shoe assembly being shiftable to anchor at one end or the other depending upon the direction of drum rotation at the time the brake is applied.

Referring to Figure 1, the shoes anchor at the left hand side of the brake, and are interconnected at the right hand side of the brake by a floating adjustable strut 64 and a tension spring 66. During braking the anchoring torque of the shoe assembly is taken by the anchor pin 68, carried by spider 26. Anchor member 68 has a shoulder 70 which abuts against one side of the spider, and the outer end of the anchor member is peened-over, as shown at 72, to secure the anchor pin to the spider, a reinforcing plate 74 being clamped between the peened-over edge of the anchor member and the side of the spider. For additional strengthening of the portion of spider 26 which carries the anchor member, a strengthening flange 76 may be formed along the periphery of the spider.

The left ends of shoes 22 and 24 are provided with concave notches 78 and 80, respectively, which engage the opposite sides of anchor pin 68 when the shoes are in released position, and which are arranged to anchor selectively during braking, depending upon the direction of drum rotation. The shoe ends are normally retained in engagement with the anchor pin by means of return spring 82, which is located on the opposite side of the spider from the shoes, and which is connected at its ends to the shoes by means of spring posts 84 which are hooked to the shoe webs as shown in Figure 3.

The inner end of anchor pin 68 is formed with a shoulder 86, against which a shoe retaining plate 88 is placed. The plate 88 is held against the shoulder 86 by riveting the end of the anchor pin, as shown at 90. Plate 88, which is generally oblong in shape, overlies the ends of the shoes which engage the anchor pin, to assist in guiding the shoes laterally, as illustrated in Figure 3.

The actuating shaft, by means of which the ends of the shoes are spread to force them into engagement with the brake drum, is shown at 92. The actuating shaft extends horizontally from the brake toward the center of the vehicle. The inner end of the shaft, which is rounded off as shown at 94, is supported in a socket, or bearing, 96 provided in the axle housing 30. The other end of the actuating shaft is supported by the end of the lower brake shoe 22. The brake-engaging end of the actuating shaft is forked to provide two longitudinally extending lugs 98 and 100, which straddle the anchor pin 68, and which rest on the end of shoe 22, as mentioned above. Lug 98 is radially outside anchor pin 68 and lug 100 is radially inside anchor pin 68. When the actuating shaft is rotated (in the counterclockwise direction as viewed in Figure 1) lug 98 acts against shoe 22 and lug 100 acts against shoe 24.

In order to permit the required vertical swiveling movement of actuating shaft 92, owing to the fact that one shoe anchors while the other moves away from the anchor, the end of the shaft which fits in bearings 96 may be very slightly undersized. However, only slight play is required at this end because the movement at the opposite end is not great and it results in a much smaller movement at the bearing end. An oblong slot 102 is provided in the cover plate 48, in order to permit the required swiveling movement of the brake-engaging end of the actuating shaft, and a cover 104 overlies the opening 102, the cover being resiliently retained against the cover plate by means of a spring 106 which is frictionally mounted on the actuating shaft.

The brake-engaging end of actuating shaft 92 is prevented from moving in the horizontal plane by engagement of the lugs 98 and 100 with opposite sides of anchor pin 68. The opposite end of the actuating shaft is, of course, retained in position by bearing 96.

Although the brake is illustrated as mounted "horizontally," i. e. in such a way that a line drawn between opposite ends of a given shoe is substantially horizontal, it could equally well be mounted in a vertical position as, for example, with anchor pin 68 at the top. With such an arrangement, vertical support of the brake-engaging end of actuating shaft 92 would be provided by engagement of lug 98 with anchor pin 68, and lateral movement of the brake engaging end of the actuating shaft would be restrained by the anchor-engaging ends of the brake shoes.

In order to turn the actuating shaft to spread the brake shoes, a lever arm 108 is keyed to the shaft. This arm is adapted to be manually operated to apply the brake, either by direct manual application of force against the arm, or through an intermediate series of links and levers. In view of the fact that the hub 110 of lever arm 108 is located next to the face of bearing 96, longitudinal movement of actuating shaft 92 toward the center of the vehicle is prevented. Longitudinal movement of the actuating shaft in the opposite direction is prevented by engagement of the outer ends of lugs 98 and 100 with the spider 26.

From the foregoing description it will be apparent that the brake and its actuating mechanism consist of an absolute minimum of parts, since no bearing sleeve is provided for the brake-engaging end of the actuating shaft, and since the lugs 98 and 100 act directly against the ends of the brake shoes. The various necessary parts of the brake, such as the supporting plate and the brake shoes, are so arranged as to provide the necessary support and guidance for the actuating shaft. The arrangement of the actuating shaft is such that the bearing alignment problem, with respect to the shaft, is eliminated.

Referring to the operation of the brake, turning actuating shaft 92 by means of lever arm 108 will cause the lugs 98 and 100 to spread the ends of the brake shoes. If we assume that, referring to Figure 1, the actuating shaft turns in a counterclockwise direction, then lug 98 acts against shoe 22 and lug 100 acts against shoe 24. If the brake drum is rotating in the counterclockwise direction, shoe 22 will move away from the anchor, and the anchoring torque will be transmitted through shoe 24 to anchor pin 68. If the brake drum is rotating in the clockwise direction, shoe 24 will move away from the anchor and the anchoring torque will be transmitted through shoe 22 to anchor pin 68. Therefore, depending upon the direction of drum rotation at the time the actuating shaft is rotated, the brake-engaging end of the shaft will shift bodily either upwardly or downwardly, as viewed in Figure 1.

Although certain particular embodiments of my invention have been described, it will be understood by those skilled in the art that the object of the invention may be attained by the use of constructions different in certain respects from those disclosed without departing from the underlying principles of the invention.

I claim:

1. For use on a vehicle having a rotatable brake drum and a non-rotatable axle housing, brake mechanism comprising a supporting plate secured to the axle housing, an anchor pin supported on said plate at one side thereof, said anchor pin extending toward the center of the vehicle, two T-section horizontally-extending brake shoes mounted on said plate, said plate having outwardly extending arms which guide the webs of said shoes, said shoes having adjacent separable end portions which engage opposite sides of the anchor pin in released position and which are arranged to anchor selectively during braking depending upon the direction of drum rotation, an actuating shaft which extends horizontally from the brake assembly toward the center of the vehicle, the end of the shaft which actuates the brake being forked to provide two longitudinally extending lugs which straddle the anchor pin and which rest on the end of one shoe, the lugs being arranged when the shaft is turned to exert a spreading force on the adjacent separable ends of the shoes, the end of the shaft remote from the brake assembly being journaled in a bearing provided by the axle housing and having sufficient play in said bearing to permit slight vertical swivelling movement of the shoe-actuating end of the shaft as the shoe ends shift toward or away from the anchor pin, and a lever arm carried by the actuating shaft which is adapted to be manually operated to apply the brake.

2. For use on a vehicle having a rotatable brake drum and a non-rotatable axle housing, brake mechanism comprising a supporting plate secured to the axle housing, an anchor pin supported on said plate at one side thereof, said anchor pin extending toward the center of the vehicle, two horizontally-extending brake shoes mounted on said plate, said shoes having adjacent separable end portions which engage opposite sides of the anchor pin in released position and which are arranged to anchor selectively during braking depending upon the direction of drum rotation, an actuating shaft which extends horizontally from the brake assembly toward the center of the vehicle, the end of the shaft which actuates the brake being forked to provide two longitudinally extending lugs which straddle the anchor pin and which rest on the end of one shoe, the lugs being arranged when the shaft is turned to exert a spreading force on the adjacent separable ends of the shoes, the end of the shaft remote from the brake assembly being journalled in a bearing provided by the axle housing and having sufficient play in said bearing to permit slight vertical swivelling movement of the shoe-actuating end of the shaft as the shoe ends shift toward or away from the anchor pin, and a lever arm carried by the actuating shaft which is adapted to be manually operated to apply the brake.

3. For use on a vehicle having a rotatable brake drum and a non-rotatable axle housing, brake mechanism comprising a supporting plate secured to the axle housing, an anchor pin supported on said plate at one side thereof, said anchor pin extending toward the center of the vehicle, two horizontally-extending brake shoes mounted on said plate, said shoes having adjacent separable end portions which engage opposite sides of the anchor pin in released position and which are arranged to anchor selectively during braking depending upon the direction of drum rotation, and an actuating shaft which extends horizontally from the brake assembly toward the center of the vehicle, the end of the shaft which actuates the brake being forked to provide two longitudinally extending lugs which straddle the anchor pin and which rest on the end of one shoe, the lugs being arranged when the shaft is turned to exert a spreading force on the adjacent separable ends of the shoes, the end of the shaft remote from the brake assembly being journalled in a bearing provided by the axle housing and having sufficient play in said bearing to permit slight vertical swivelling movement of the shoe-actuating end of the shaft as the shoe ends shift toward or away from the anchor pin.

4. For use on a vehicle having a rotatable brake drum and a nonrotatable axle housing, brake mechanism comprising a supporting plate secured to the axle housing, an anchor pin supported on said plate at one side thereof, two horizontally-extending brake shoes mounted on said plate, said shoes having adjacent separable end portions which engage opposite sides of the anchor pin in released position and which are arranged to anchor selectively during braking depending upon the direction of drum rotation, and an actuating shaft which extends horizontally from the brake assembly toward the center of the vehicle, the end of the shaft which actuates the brake being forked to provide two longitudinally extending lugs which straddle the anchor pin and which rest on the end of one shoe, the lugs being arranged when the shaft is turned to exert a spreading force on the adjacent separable ends of the shoes, the end of the shaft remote from the brake assembly being journalled in a bearing provided by the axle housing and having sufficient play in said bearing to permit slight vertical swivelling movement of the shoe-actuating end of the shaft as the shoe ends shift toward or away from the anchor pin.

5. For use on a vehicle having a rotatable brake drum and a nonrotatable axle housing, brake mechanism comprising a supporting plate secured to the axle housing, an anchor pin supported on said plate, two brake shoes mounted on said plate, said shoes having adjacent separable end portions which engage opposite sides of the anchor pin in released position, and an actuating shaft which extends horizontally from the brake assembly toward the center of the vehicle, the end of the shaft which actuates the brake being forked to provide two longitudinally extending lugs which straddle the anchor pin and lie between the ends of the shoes, the lugs being arranged when the shaft is turned to exert a spreading force on the adjacent separable ends of the shoes, the end of the shaft remote from the brake assembly being journalled in a bearing provided by the axle housing and having sufficient play in said bearing to permit tangential swivelling movement of the shoe-actuating end of the shaft as the shoe ends shift toward or away from the anchor pin.

6. Brake mechanism comprising a supporting plate secured to a nonrotatable member, an anchor member supported on said plate, an expansible friction device mounted on said plate having adjacent separable end portions which are located in released position by engagement with the anchor member, and an actuating shaft provided with a forked end portion having two longitudinally extending lugs which straddle the anchor member, the lugs being arranged when the shaft is turned to exert a spreading force on the adjacent separable ends of the friction device, the end of the shaft remote from the friction device being journalled in a bearing provided in a nonrotatable member and having sufficient play in said bearing to permit tangential swivelling movement of the actuating end of the shaft.

7. For use in cooperation with a rotatable brake drum, brake mechanism comprising a nonrotatable supporting plate, an anchor pin carried by said supporting plate, two T-section horizontally-extending brake shoes mounted on said supporting plate, said supporting plate having outwardly extending arms which guide the webs of said shoes, said shoes having adjacent separable end portions which engage opposite sides of the anchor pin in released position and which are arranged to anchor selectively during braking depending upon the direction of drum rotation, and an actuating shaft having one end forked to provide two lugs which straddle said anchor pin and which rest on the end of one shoe for brake release condition, said lugs being arranged when the shaft is turned to exert a spreading force on the adjacent separable ends of the shoes, the end of the shaft remote from the brake assembly being adapted to be journaled in a bearing to permit movement of the shoe-actuating end of the shaft as said end portions shift toward or away from the anchor pin, said shaft being held against movement radially of the brake assembly by engagement with opposite sides of said anchor pin.

8. For use in cooperation with a rotatable brake drum, brake mechanism comprising a nonrotatable supporting plate, an anchor pin carried by said supporting plate, two brake shoes mounted on said supporting plate, said shoes having adjacent separable end portions which engage opposite sides of the anchor pin in released position, and an actuating shaft having one end forked to provide two lugs which straddle said anchor pin and which rest on the end of one shoe for brake-release condition, said lugs being arranged when the shaft is turned to exert a spreading force on the adjacent separable ends of the shoes, the end of the shaft remote from the brake assembly being adapted to be journaled in a bearing to permit movement of the shoe-actuating end of the shaft as said end portions shift toward or away from the anchor pin, said shaft being held against movement radially of the brake assembly by engagement with opposite sides of said anchor pin.

9. For use in cooperation with a rotatable brake drum, brake mechanism comprising a nonrotatable supporting structure, an anchor pin carried by one part of said structure, a friction device having adjacent relatively movable end portions which engage said anchor pin in released position, an elongated opening provided in said structure and located opposite said pin, the length dimension of said opening extending tangentially of the brake mechanism, and a rotatable brake actuating member extending through said opening and having one end bifurcated to straddle said anchor pin, said bifurcated end being arranged between said end portions whereby rotation of said actuating member will cause a spreading force to be exerted on said end portions, the other end of said actuating member being adapted to be journaled in a bearing to permit movement of the bifurcated end of said member in said opening as said end portions shift toward or away from said anchor pin, said member being held against movement radially of the brake assembly by engagement with opposite sides of said anchor pin.

10. For use in cooperation with a rotatable brake drum, brake mechanism comprising a nonrotatable supporting structure, an anchor pin carried by one part of said structure, a friction device having adjacent relatively movable end portions which engage said anchor pin in released position, an elongated opening provided in said structure and located opposite said pin, the length dimension of said opening extending tangentially of the brake mechanism, and a rotatable brake actuating member extending through said opening and having one end arranged between said end portions whereby rotation of said actuating member will cause a spreading force to be exerted on said end portions, the other end of said actuating member being adapted to be journaled in a bearing to permit movement of said one end of said member in said opening as said end portions shift toward or away from said anchor pin, said member being held against movement radially of the brake assembly by engagement with the anchor pin.

References Cited in the file of this patent

UNITED STATES PATENTS

| | | |
|---|---|---|
| Re. 18,966 | Lauer | Oct. 10, 1933 |
| 1,595,136 | Andres | Aug. 10, 1926 |
| 1,616,586 | Lefere | Feb. 8, 1927 |
| 1,660,932 | McDonald | Feb. 28, 1928 |
| 1,756,982 | La Brie | May 6, 1930 |
| 1,852,103 | Bendix | Apr. 5, 1932 |
| 1,930,779 | Snell | Oct. 17, 1933 |
| 1,932,896 | Hunt et al. | Oct. 31, 1933 |
| 2,030,272 | Schnell | Feb. 11, 1936 |
| 2,031,717 | Kohr | Feb. 25, 1936 |
| 2,412,335 | House | Dec. 10, 1946 |
| 2,429,815 | House | Oct. 28, 1947 |
| 2,475,492 | Goepfrich et al. | July 5, 1949 |
| 2,481,144 | Neale | Sept. 6, 1949 |

FOREIGN PATENTS

| | | |
|---|---|---|
| 864,832 | France | May 6, 1941 |